United States Patent [19]
Kleinsasser

[11] Patent Number: 5,862,779
[45] Date of Patent: *Jan. 26, 1999

[54] FLOORING APPARATUS FOR AN ANIMAL PEN

[75] Inventor: Jonathan Kleinsasser, Ste. Agathe, Canada

[73] Assignee: Crystal Spring Colony Farms Ltd., Ste. Agathe, Canada

[ * ] Notice: The term of this patent shall not extend beyond the expiration date of Pat. No. 5,749,323.

[21] Appl. No.: 584,964

[22] Filed: Jan. 11, 1996

Related U.S. Application Data

[63] Continuation-in-part of Ser. No. 573,934, Dec. 18, 1995.

[51] Int. Cl.⁶ .................................................. A01K 1/00
[52] U.S. Cl. .......................................... 119/529; 119/530
[58] Field of Search ................................... 119/528, 529, 119/530, 450

[56] References Cited

U.S. PATENT DOCUMENTS

| | | | |
|---|---|---|---|
| Re. 28,834 | 6/1976 | Johnson | 119/529 |
| 3,633,548 | 1/1972 | Kepple | 119/529 |
| 5,113,794 | 5/1992 | Rahm | 119/529 |
| 5,351,458 | 10/1994 | Lehe | 119/529 X |

FOREIGN PATENT DOCUMENTS

| | | | |
|---|---|---|---|
| 3204754 | 8/1983 | Germany . | |
| 93/22905 | 11/1993 | Germany | 119/529 |
| 2006305 | 5/1979 | United Kingdom . | |
| 93/22905 | 11/1993 | WIPO . | |

OTHER PUBLICATIONS

Photograph including an illustration (1 sheet) of the photograph.

*Primary Examiner*—Michael J. Carone
*Assistant Examiner*—Yvonne R. Abbott
*Attorney, Agent, or Firm*—Adrian D. Battison; Murray E. Thrift

[57] ABSTRACT

A slat for forming a flooring structure for a hog pen and particularly the area under the sow in a farrowing crate is rectangular with side edges which abut side edges of adjacent slats to align the slats in a row. Each side edge has tabs projecting outwardly to interlock above or below tabs on the next adjacent slat to prevent lifting of the slats. The length of the slat is greater than 24 inches so that it can sit with its ends on top of an existing flooring spaced at exactly 24 inches. The slats can be supported on and held in place against longitudinal movement relative to edges of an underlying flooring by inter engaging strip elements which engage onto castellated members on the edge of the underlying flooring and include upstanding flanges which stand up under the edges of the slats to hold the slats above the flooring.

20 Claims, 7 Drawing Sheets

FLOORING APPARATUS FOR AN ANIMAL PEN

This application is a continuation in part application of application Ser. No. 08/573,934 filed 18th Dec. 1995.

BACKGROUND OF THE INVENTION

This invention relates to a flooring apparatus for an animal pen which includes a plurality of slats arranged so that end edges of the slats lie along a pair of common parallel lines with sides of the slats abutting to form a generally rectangular flooring area and a support system for the slats.

The flooring apparatus of the present invention is particularly but not exclusively designed for use in a farrowing crate for hogs in which the slats define a flooring area lying underneath the sow.

Such flooring slats have previously been manufactured and sold and are presently in wide use. Such flooring slats generally have a length of 24 inches and a width which is less than 24 inches so that when the slats are arranged side by side they define a flooring area of approximately 72 inches by 24 inches which is sufficient to receive the body of the sow when lying.

Such slats are generally formed of cast iron which has been found to provide sufficient strength to accommodate the heavy wear which occurs under the sow particularly when attempting to stand from the normal lying condition.

Such slats are generally formed with a series of parallel slotted perforations which extend across the width of the slat from one side edge toward the opposed side edge. In order to provide sufficient strength for the slat, the slotted perforations extend only partway across the width so as to form a series of such slotted perforations end to end across the width.

Such slats also include tabs at the side edges with at least one tab at each side edge being arranged at a top surface of the slat so as to overlie a corresponding tab at the second edge of the next adjacent slat which is arranged at the bottom surface of the slat. These tabs thus prevent the slats from being lifted each relative to the next.

The slats are generally supported on a pair of parallel vertical flanges each adjacent to but spaced slightly inwardly from a respective one of the end edges and the underside of each slat has downwardly projecting abutments which hold the slat in place on top of the flanges.

In one example of a slat of this type shown in a brochure, a very shallow rib is provided along each end edge projecting upwardly from the upper surface by the distance of the order of 1/16 inch.

SUMMARY OF THE INVENTION

It is one object of the present invention to provide an improved floor structure in which a second floor assembly defined by a plurality of floor slats are mounted on top of a first floor assembly defined by a plurality of panels so as to be supported thereby.

According to the invention there is provided a floor structure for an animal containment pen comprising: a first floor assembly including: a plurality of floor panels, each panel having an upper surface for receiving an animal thereon, two end edges spaced by a length of the panel and two side edges spaced by a width of the panel; a support structure for supporting the panels in a row in side by side relationship so that the end edges of the panels at one end of the panels lie in a first common line along one side of the first floor assembly and the end edges at an opposed end of the panels lie in a second common line parallel to the first common line; each of the end edges of the panels including inter engaging means thereon for interconnecting with an end edge of a similar one of the panels; a second floor assembly including: a plurality of generally rectangular slats, each slat having an upper surface for receiving an animal thereon, two end edges spaced by a length of the slat and two side edges spaced by a width of the slat; and support means for supporting the slats in a row in side by side relationship so that the end edges of the slats at one end lie in a first common line along one side of the floor structure and the end edges at an opposed end lie in a second common line parallel to the first common line along an opposed side of the floor structure so that the floor structure has a first dimension equal to a length of the slats and a second dimension at right angles to the first dimension which is the sum of the widths of the plurality of the slats; the support means including a plurality of support elements arranged such that said one end edge of the slats of the second floor assembly lies at said end edges of the panels at said one end of the panels of the first floor assembly; said support elements being separate from the panels and from the slats and including inter engaging means engaging into said inter engaging means at said one end of the panels and an abutment member carried by the inter engaging means; the slats each including receptacle means for engaging at least one of the abutment members such that the slats are supported on the support elements.

Preferably the abutment member is upstanding from the inter engaging means to a height above upper surface of the panels such that the slat supported thereon has an upper surface at a height above the upper surface of the panels.

Preferably the abutment member comprises an elongate flange extending longitudinally of the edge.

Preferably the support elements each comprise a strip defining a substantially straight edge on a face thereof opposite the inter engaging means.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

A flooring system for an animal husbandry pen, particularly a farrowing crate for pigs comprises a floor structure generally indicated at 10 defined from a plurality of horizontal slats 11, 12 which are arranged in side to side abutting relationship at abutting side edges 13 and 14 of the slats 11 and 12. The slats thus have end edges 15 and 16 together with the side edges 13 and 14 so that each slat is generally rectangular and all the slats are equal.

The slats are arranged in a row in side to side relationship and are mounted on a support structure defined by a pair of flanges 18 and 19 which hold the slats so the end edges 15 lie in a common line 15A and the end edges 16 lie in a common line 16A. The spacing between the lines 15A and 16A is thus equal to the length of the slat. The flooring structure has a dimension in a direction at right angles to the length of the slat which is equal to the sum of the widths of the slats.

In practice the distance between the lines 15A and 16A is of the order of 24 inches and the distance of the flooring structure at right angles to that distance is of the order of 78 inches that is 6 slats each having a width of 14 inches.

One of the slats is shown in detail in FIGS. 1 through 4. A slat is formed from cast iron which has sufficient strength to accommodate the forces from the heavy sow when lying, standing and particularly when attempting to stand from a lying position.

Figure 3:
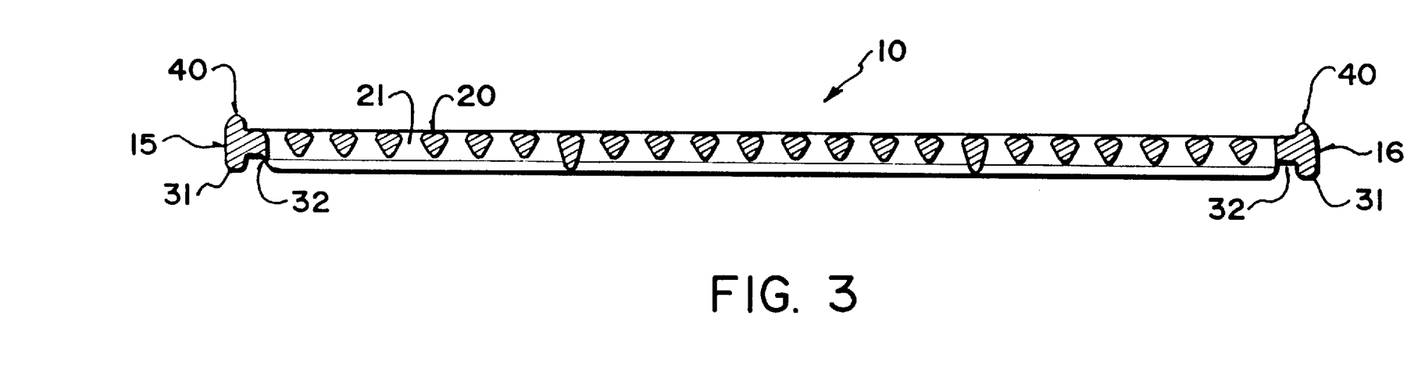
FIG. 3 is a cross sectional view along the lines 3—3 of FIG. 1.
Figure 4:
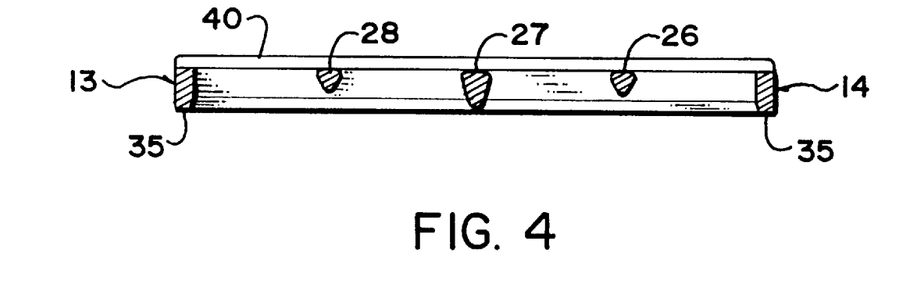
FIG. 4 is a cross sectional view along the 4—4 of FIG. 1.
Figure 5:
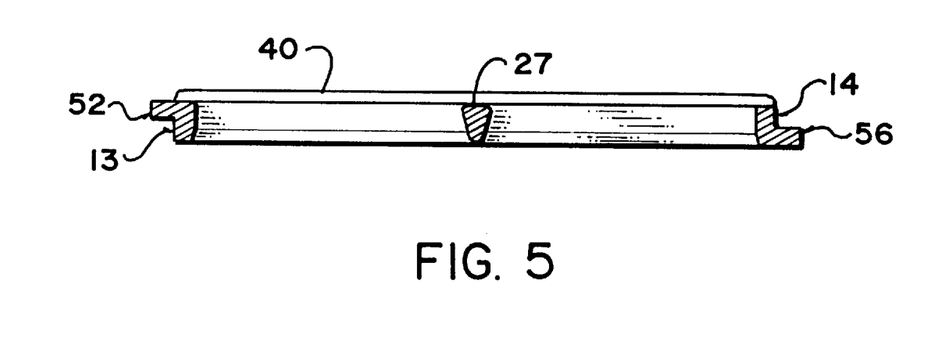
FIG. 5 is a cross sectional view along the lines 5—5 of FIG. 1.

The slat is formed by bars each arranged at a respective one of the edges of the slat with those bars standing substantially vertically. Between the bars is formed a cast sheet defined by bars 20 which extend across the width of the slat from the side edge 13 to the side edge 14 with those bars being separated by slot shaped perforations 21. As shown in FIG. 3 each bar 20 has a convexly curved top surface in cross section. The top surface 22 has a central highest part and tapers gradually downwardly from the center part to each side surface 23, 24 of the bar. The side surfaces converge inwardly and downwardly substantially to an apex 25 defining the lower surface of the bar with that lower surface having a width significantly less than that of the upper surface. The converging sides 23 and 24 allow the shape of the bar to be cleaned by high pressure water or liquid spray so that the liquid spray jetted from above the slat can pass along each side 23, 24 and can reach or substantially reach the apex 25 thus cleaning the whole of the bar from the upper surface.

The bars 20 are interconnected along their length by longitudinally extending connecting pieces 26, 27 and 28. Thus as best shown in the plan view of FIG. 1, a first bar 20A is connected to a second bar 20B by four such interconnecting pieces. The second bar 20B is connected to a third bar 20C only by one interconnecting piece which is arranged centrally of the bars. Thus between the first and second bars is provided four separate slots 21. Between the second and third bars is provided two separate slots 21. The slots are arranged in rows and columns to form an array with the slots generally parallel to the end edges 15 and 16 and spaced longitudinally of the side edges.

Figure 1:
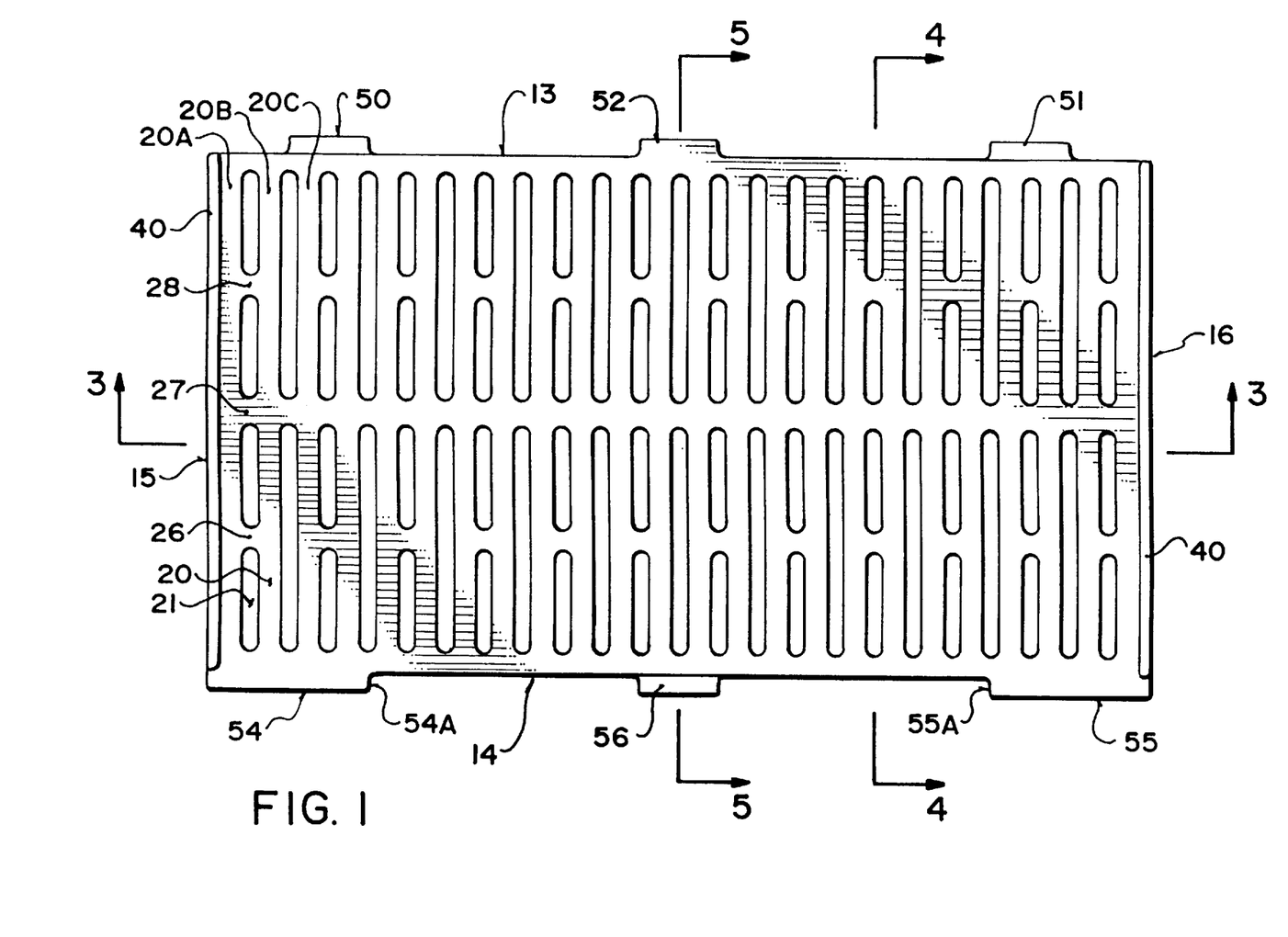
FIG. 1 is a top plan view of the slat of the present invention.
Figure 2:
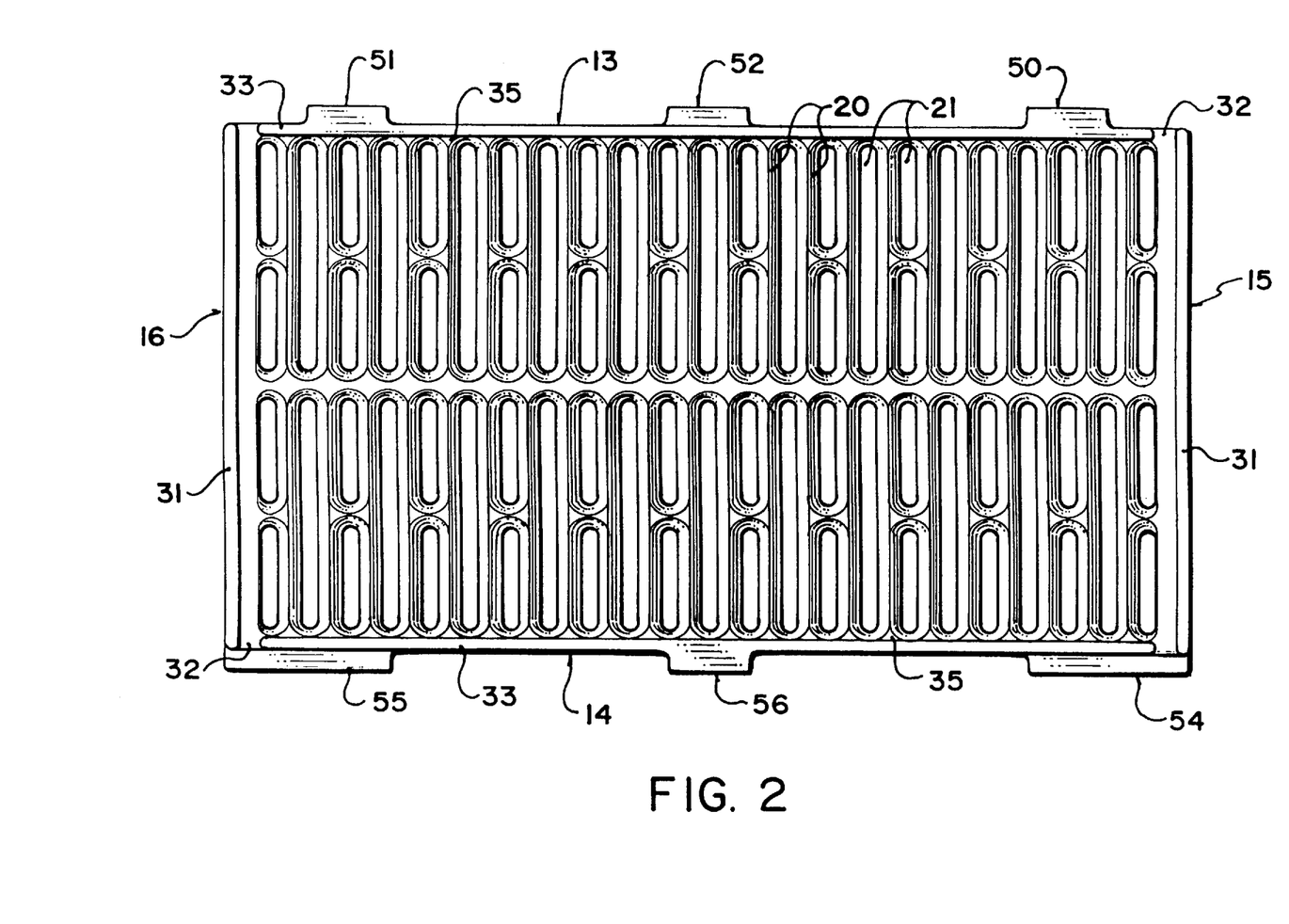
FIG. 2 is a bottom plan view of the present invention.

At the end edges 15 and 16 the vertical bar defining each end edge has an outer surface 29 facing outwardly away from the body of the slat. Similarly the end edge 16 has a surface 30 facing away from the body of the slat in a direction opposite to the surface 29. The bottom of the bar at each end edge comprises a rib 31 extending along the end edge and defining on the bottom surface of the slat a recess 32 inwardly of the rib 31 for receiving a respective one of the flange members 18 and 19. The recess 32 on its inner side 33 is defined by one or more downwardly depending tabs at spaced positions across the width of the slat. Thus the recess 32 defined on one side by the rib 31 on the other side by the tabs 33 holds the flange 18, 19 in place and prevents side to side movement of the slat relative to the flanges. As shown in FIG. 2, the tabs 33 are arranged only at the sides of the slat and are in effect defined by the bottom part of the bar 35 forming the structure of the slat at the respective side edge 13, 14.

The top part of the bar forming the end edge 15, 16 forms an upstanding rib 40 which stands upwardly from an upper surface 41 of the slat which is defined by the upper surfaces 22 of the bars 20 and that portion of the body of the slat which is above the recess 32 which is in a common plane with the top of the bars 20.

The rib 40 is provided to define a resisting surface tending to engage the foot of the animal when sliding or moving longitudinally of the slat and thus to resist such sliding movement of the foot of the animal and to assist the animal in gaining foothold and standing from a lying position. Thus the rib 40 has an inner surface 42 which is substantially at right angles to the horizontal upper surface 41 of the slat and stands upwardly therefrom to a height of the order of 0.2 inches. From the inside surface 42, the rib 40 is smoothly curved in an arcuate radiused section 43 into a top surface 44 and then a downwardly inclined side surface 45 which intersects the vertical surface 29 defined in the end edge of the slat. The portion of the rib defined by the surface portions 43, 44 and 45 is smoothly curved with relatively wide radius of curvature so that a piglet lying on the rib is not presented with sharp edges which could cause discomfort. At the same time the vertical surface 42 allows the piglet again to gain purchase on the rib so that the piglet can push forwardly against the surface 42 to push its snout into the stomach of the sow for gaining access to the nipples.

The specific shape of the rib therefore gives purchase on the inside for the sow and the piglets and yet avoids the presentation of sharp edges particularly on the top and outer surface which could cause discomfort to the suckling piglet. More particularly the angle of inclination of the side 45 of the rib is very much less than that of the 90° of the side 42 and is generally of the order of 45° which provides a smooth intersection with the vertical surface 29.

Each of the side edges 13 and 14 includes a plurality of tabs which project outwardly from the side edge in a plane which is generally parallel to the upper surface 41 of the slat. These tabs in general are arranged to overlap so as to prevent lifting of one slat relative to the next. Thus the side edge 13 includes two end tabs 50 and 51 together with a single intermediate tab 52. Each of the tabs has a height relative to the edge which is approximately equal to or slightly less than one half of the edge height. As will be apparent from a comparison of FIGS. 1 and 2, the tabs 50 and 51 are arranged at the bottom of the edge 13 and the tab 52 is arranged at the top of the edge.

The edge 14 similarly includes tabs 54, 55 and 56. The tabs 54 and 55 are arranged at the top of the edge 14 and the tab 56 is arranged at the bottom of the edge 14. The tabs 54 and 55 extend from the respective adjacent end edge 15, 16 to an end of the tab 54A, 55A which is spaced from the respective end edge and is also spaced from the tab 56. Thus the tabs 54 and 55 are wider than the tabs 50 and 51 since those tabs are spaced from the respective end edge 15, 16. The tab 56 is however substantially coextensive with the tab 52.

Each of the tabs has an outer edge which is directly parallel to the associated side edge of the slat and the width of the tabs that is the distance projecting outwardly from the side edge is equal for each of the tabs.

Figure 6:
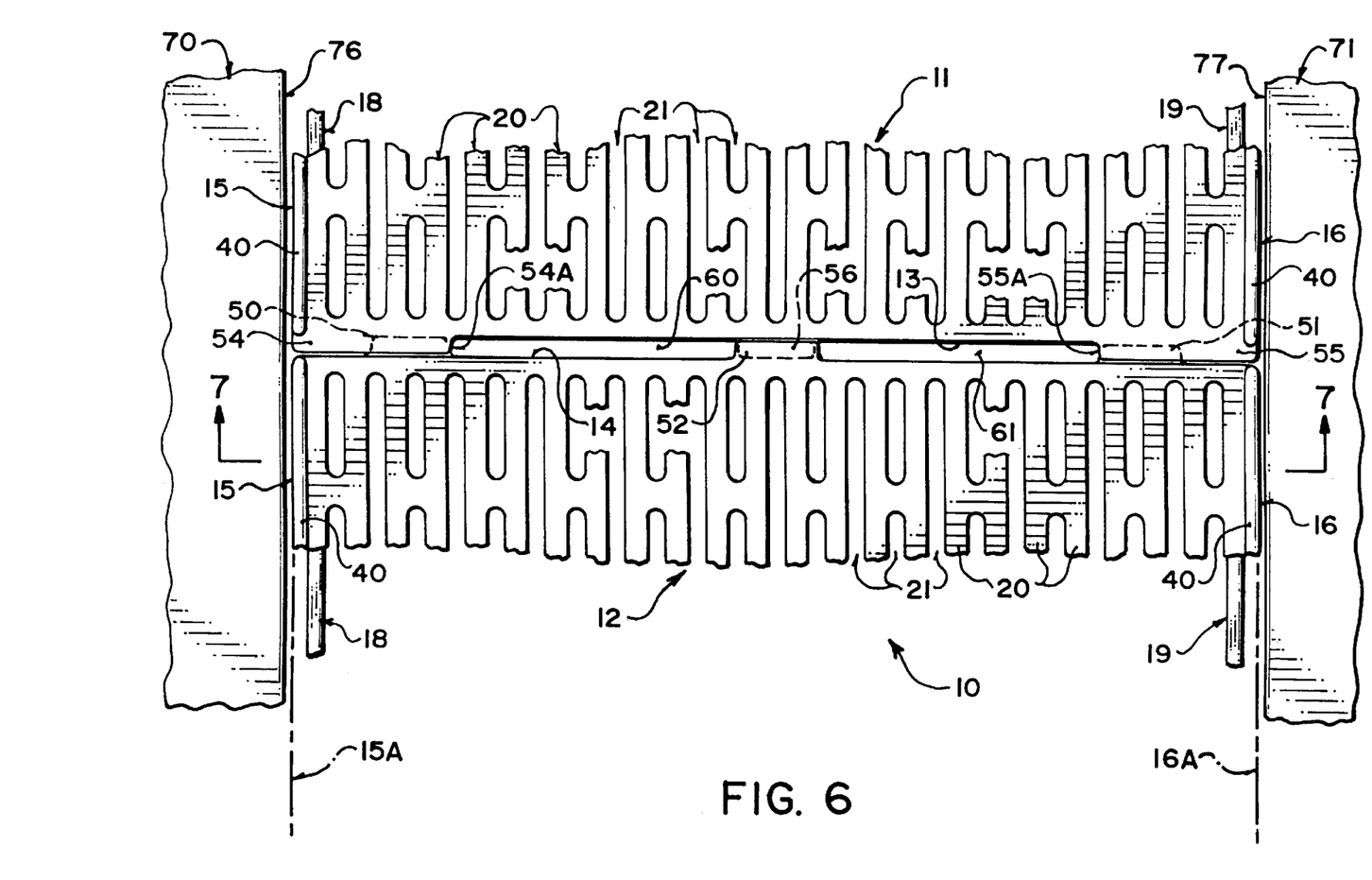
FIG. 6 is a top plan view showing the abutment between the sides edges of two of the slats.

In the position shown in FIG. 6, the slats are arranged in he side to side abutting position in which the side edge of one slat 11 is arranged immediately adjacent the side edge 14 of the next adjacent slat 12. It will be appreciated therefore that the outside edges of the tabs actually abut the side edge of the next adjacent slat. Since the tabs are all of the same width, the side edges 13 and 14 of the slats are held spaced by a distance equal to the width of the tabs. Thus as shown in FIG. 6, the tab 54 overlies the tab 51, the tab 55 overlies the tab 50 and the tab 52 overlies the tab 56. Thus the tabs 51 and 50 hold down the edge 14 of the slat 12 and the tab 56 holds down the edge 13 of the slat 11 so that neither slat can be lifted at these abutting edges.

The end 54A of the tab 54 is spaced outwardly from the tab 52 thus leaving a slot shaped opening 60 between the end 54A and the tab 52. This slot shaped opening 60 thus forms a perforation through the flooring at the junction between the edges 13 and 14 and allows material to fall through the flooring at this position. A similar slot shaped perforation 61 is located between the tab 52 and the edge 55A of the tab 55. These slot shaped perforations are thus arranged so that the longitudinal direction is at right angles to the longitudinal direction of the slot shaped perforations 21 in the slat itself. These slots 60 and 61 thus form a foothold allowing improved purchase for the animals foot in a direction transverse to the length of the slats.

The length of the slot from its inner most edge to the outer edge 54A or 55A is greater than the width of the tab 54 or 55 respectively so that the slots are in effect as long as possible while providing sufficient structural strength for the tab 54 and 55. This provides slots which extend along the majority of the length of the slat to arrange at the order of ⅔ to ¾ of the length of the slat in total. This length of the slots 60 and 61 allows the animal to gain purchase when attempting to stand as the feet tend to slide longitudinally of the flooring that is transverse to the length of the slat. When attempting to stand the feet of the animal tend to be at the sides of the flooring that is at the end of the slats so that the provision of the slots 60 and 61 which extend to a position closely adjacent the ends of the slat allow the animals foot to engage the slot and provide an increased purchase. The upper surface of the slat is smooth that is free from ribs apart from the ribs 40 as previously described which lie along the ends of the slat so that there is no rib adjacent the slots 60 and 61. It is therefore the provision of the slot itself which provides any purchase in this direction since the slot has a significantly increased level of purchase relative to the provision of an upstanding rib.

Figure 7:
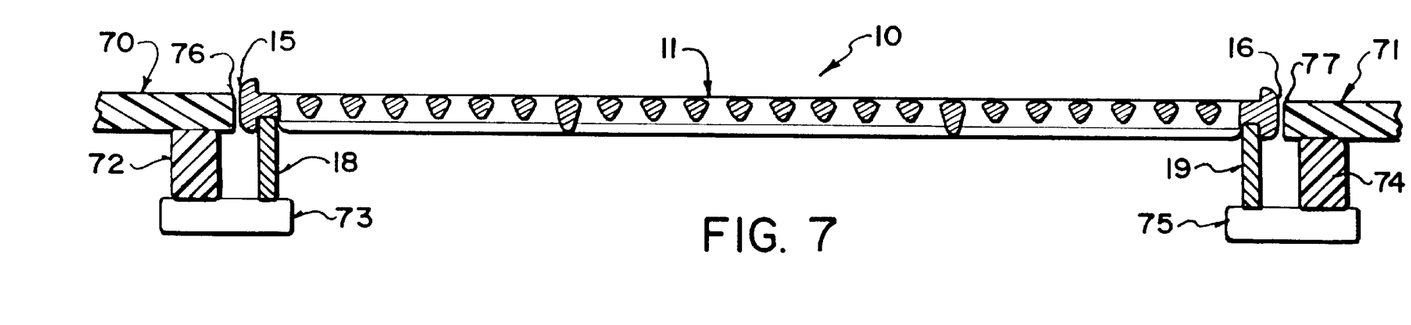
FIG. 7 is a cross sectional view longitudinally through one of the slats showing the mounting of the slats on a flooring support structure.

Turning now to FIG. 7, the flooring structure defined by the plurality of slats mounted on the flanges 18 and 19 form as a part of a whole flooring structure including a first sheet of flooring material 70 and a second sheet 71 of the same or similar flooring material. The type and construction of the flooring material 70, 71 can vary in accordance with requirements and is well known to one skilled in the art and will therefore not be described herein. The edge of the sheet 70 is mounted on a suitable support beam 72 carried on a main support member 73 which carries the flange 18. Similarly the edge of the sheet 71 is carried on a beam 74 again mounted on a main support 75 which supports the flange 19. The sheet 70 thus has an edge 76 abutting the end edges 15 of the slats. Similarly the sheet 71 has an end edge 77 abutting the end edges 16 of the slats. Thus the flooring is effectively continuous and is made up of the sheets 70, 71 and the slats 11, 12 etc. All of the flooring is of a type which can be cleaned by injection of a cleaning fluid. All of the flooring materials have perforations or openings so that the manure from the animals can fall through the perforations or slots into a pit (not shown) underneath the supports 73 and 75.

Figure 8:
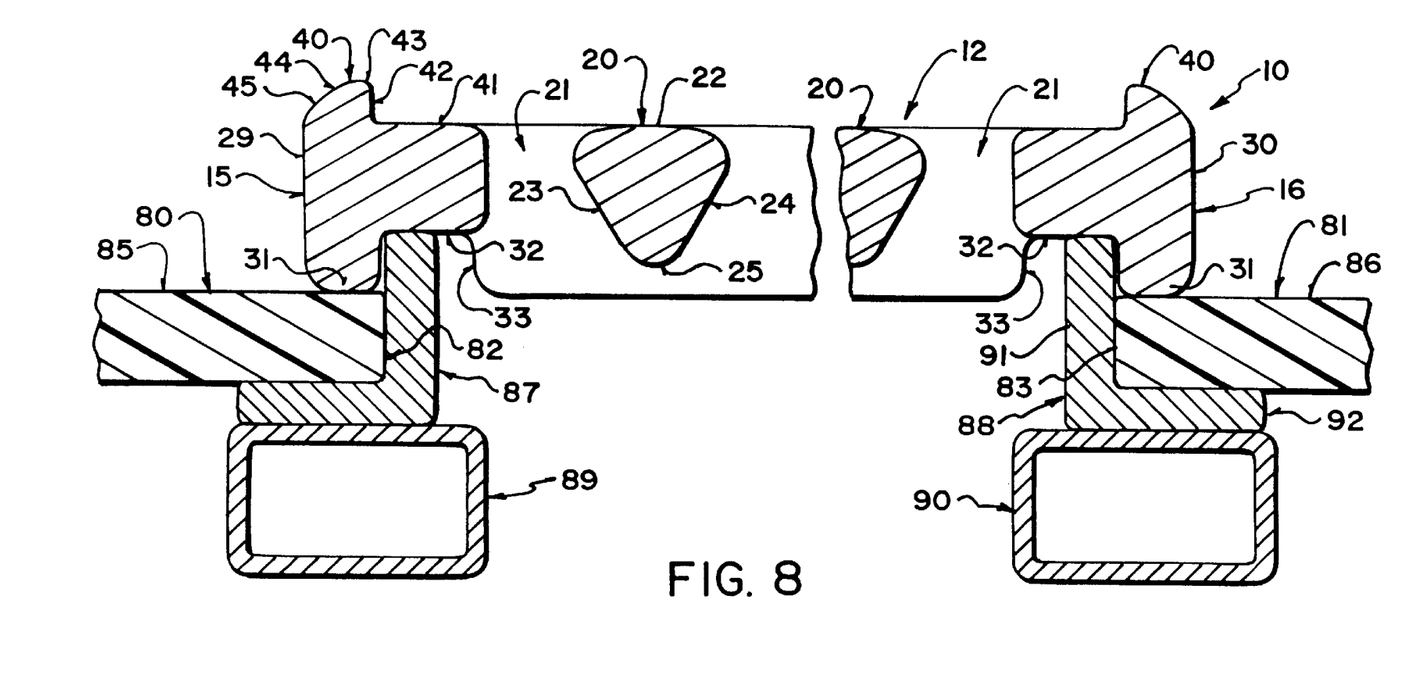
FIG. 8 is a cross sectional view of FIG. 7 on an enlarged scale showing a modified flooring support structure of a type arranged for insertion of the slats into an existing flooring.

Turning now to FIG. 8, there is shown a modified support assembly for the flooring which can be used in a situation where an existing flooring has worn in the area under the sow and thus requires replacement only in that area leaving two sheets 80 and 81 of existing flooring material which is similar acceptable condition since it lies under the area where the piglets will be confined. The sheet 80 has an end edge 82 and the sheet 81 has an end edge 83. In practice such flooring is manufactured so that the edges 82 and 83 are spaced by exactly 24 inches. In the construction shown in FIG. 8, therefore, it will be appreciated that a panel or portion of the flooring has been removed at the area under the sow and that portion has a width exactly equal to 24 inches so that it sits with the edges of the removed section normally lying in abutting position against the edges 82 and 83.

The slats as described herein before are however manufactured with a length which is greater than 24 inches and preferably of the order of 24.5 inches so that lengths of the slats between the end edges 15 and 16 is greater than the distance between the edges 82 and 83. Thus the slats stand on top of the upper surfaces 85 and 86 of the sheets 80 and 81. The bottom of the rib 31 thus sits directly on the top surface 85, 86 and supports the slat at a position above the existing flooring defined by the sheets 80 and 81.

In order to locate the slats and prevent movement of the slats relative to the existing sheets 80 and 81 in a direction longitudinal of the slats, a pair of angle irons 87 and 88 are inserted under the edges 82 and 83 respectively of the sheets 80 and 81 and on top of the existing support beams 89 and 90 which would normally carry the end edges 82 and 83 together with the end edges of the panel which has been removed. Thus each angle iron 87, 88 has a pair of legs 91 and 92 which are arranged at right angles. The angle irons 87 and 88 extend along the intended area of the flooring structure and preferably lie along the full length defined by the side-by-side slats. The leg 92 of each of the angle irons is simply slipped underneath the edge of the respective sheets so that the leg 92 is fully covered by the sheet. Thus the edge 83 of the sheet abuts the inside surface of the leg 91. This prevents any contamination from collecting in the area between the leg 91 and the edge 83. The leg 91 stands upwardly beyond the upper surface 86 and thus projects into the recess 32 of the slat to abut the side surfaces of the recess 32 and thus prevent the movement of the slat in the longitudinal direction of the slat.

The manufacture of the slat therefore in a length greater than the 24 inches between the edges 82 and 83 allows the slat to be used as a replacement of renovation in which the slat sits on top of the existing flooring and there is provided a suitable abutment system which in the example shown is constituted by the angle irons to prevent the longitudinal movement of the slat which could allow it to fall into the opening between the edges 82 and 83.

The angle irons 87 and 88 are held in place simply by frictional engagement between the top surface of the beam 89, 90 and the undersurface of the flooring sheet.

In the renovation process, the worn sheet is simply removed from the area between the edges 82 and 83 and the angle irons inserted in place simply by lifting the edge 82, 83 away from the supporting beam allowing the angle iron to be pressed in place and held in place on top of the beams 89, 90. Thus with the flanges 91 standing upwardly, the slats can simply be dropped into place with the tabs interlocking as previously described thus holding the flooring structure properly in place without possibility of movement longitudinally nor transversely.

In an alternative arrangement (not shown) the angle irons 87 and 88 can be omitted and the slats simply placed so that the ribs 31 sit on top of the surfaces 85 and 86. In this arrangement the slats themselves are formed with projecting tabs (not shown) which extend downwardly into the opening so as to abut the surfaces 82 and 83 to prevent the longitudinal movement of the slats. For this purpose, of course, the slat must have a length greater than the space between the edges 82 and 83 which is sufficient to provide the necessary support for the slat which is carried only at those portions of the slat which extend outwardly beyond the edges 82 and 83.

Figure 9:
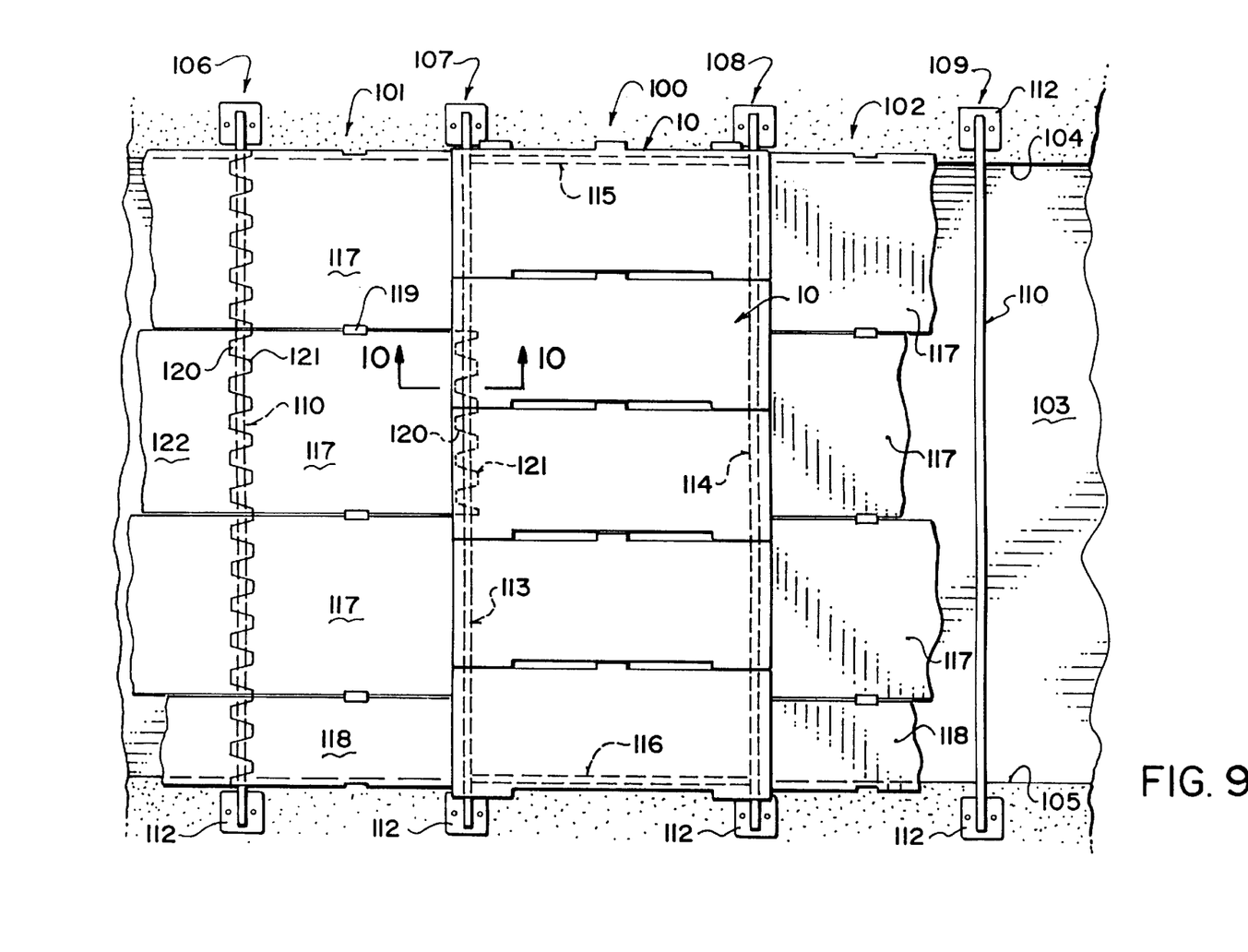
FIG. 9 is a top plan view showing a flooring structure for a farrowing crate including a center section for the sow and two side sections for the piglets, the floor slats of the center section being as shown in FIGS. 1 to 6.
Figure 10:
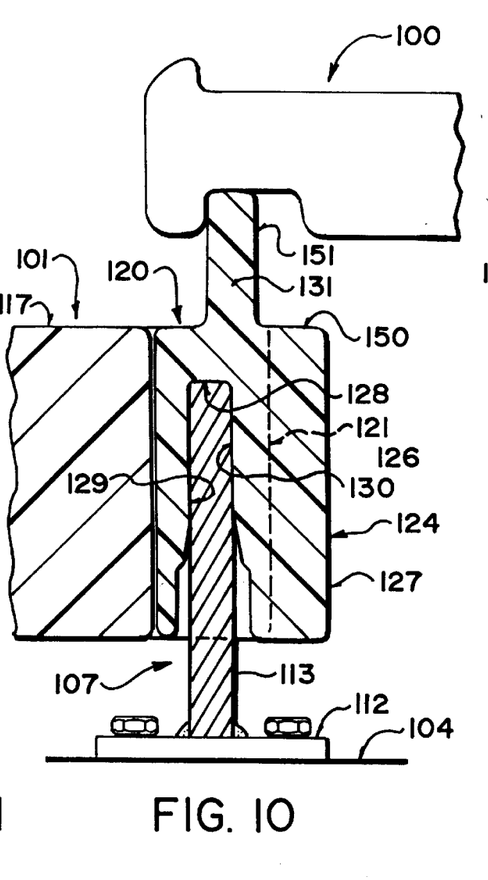
FIG. 10 is a cross-sectional view along the lines 10—10 of FIG. 9 on an enlarged scale.
Figure 11:
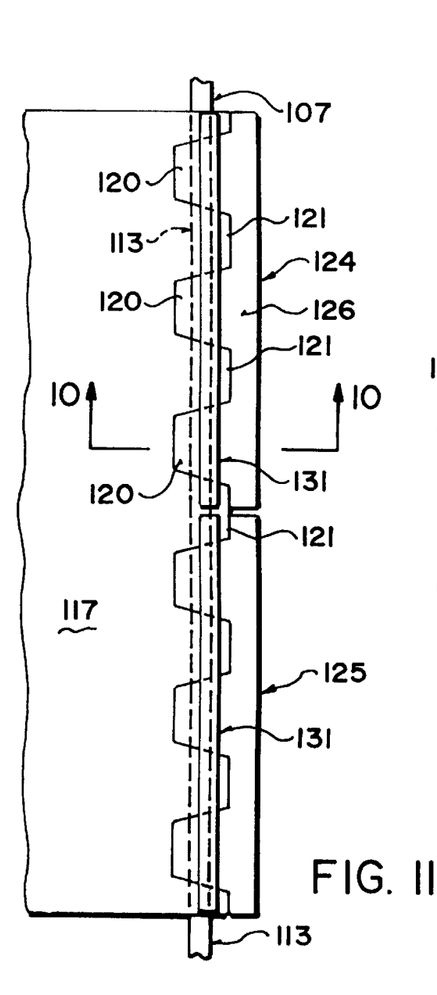
FIG. 11 is a top plan view of the edge of one floor panel at the edge underlying the slats with the slats removed to show the construction of the support elements which engage the edge and carry a flange to support the slats.

Turning now to FIGS. 9, 10 and 11, there is shown a flooring structure utilizing the slats 10 as previously described. The slats 10 are used to form a central flooring section 100 between two side sections 101 and 102 thus forming the floor of a farrowing crate in which the sow can rest on the central section 100 and is inhibited from entering the side sections 101 and 102 where the piglets can reside. It is known that the sow has a much greater weight and therefore much increased tendency to wear the flooring so it is highly desirable that the central section 100 is formed from a material which is much more resistant such as the cast slats previously described. It is also known that the piglets prefer to reside in the area which is formed of a warmer plastic material and the piglets have a reduced tendency to provide wear of the flooring so that the sections 101 and 102 can be formed from a lighter weight material such as plastics which is thus of reduced cost.

It will be appreciated that the foreign crate flooring is associated with fence panels and rails which are not shown which isolate the sow into the crate with its own piglets and separate that crate from a next adjacent crate containing another sow and its piglets. The construction and arrangement of the fencing and rails is well known to one skilled in the art.

The floor structure thus shown in FIG. 9 comprises a first flooring assembly 101 and a second flooring assembly 100 defined by the slats 10.

The flooring is mounted over a pit 103 defined by two concrete side walls 104 and 105 which are raised up from the pit leaving the area of the pit between the two raised side walls for receiving manure which falls through the slots and openings in the floor as previously described.

Across the pit is mounted four beams 106, 107, 108 and 109. Each of the beams is formed by a vertical flange 110, 113, 114 which is welded at its ends to horizontal foot pads 112 which are bolted to the respective walls 104 and 105.

The flanges 113 and 114 forming the support beams of the supports 107 and 108 are interconnected by cross flanges 115 and 116 to form a rectangular frame structure thus providing more structural stability and strength in the area under the sow.

The flooring section 101 between the vertical flanges 110 and 113 is defined by a plurality of panels 117 which are of the same size and a further panel 118 of reduced width. The panels are arranged side to side with the ends of the panels aligned over the rails 110 and 113.

The panels 117 and 118 are of a type well known and widely used in the industry which are formed of plastics material by an injection molding process defining a series of ribs forming slots between the ribs in a somewhat similar manner to that described in the above slat. The ribs and slots are not shown in the figures as these are well known to one skilled in the art and can vary in accordance with design requirements. One example of a flooring of this material is manufactured under the trademark Smidley "Surestep". The panels have interconnecting notches 119 at their side edges so that each is connected at its side to the next adjacent panel. At the ends, the panels include a series of castellated members 120 which project outwardly from the end so as to intermesh with similar castellated projections 121 of an adjacent panel 122. Thus each panel has at each end interengagement means for intermeshing with the interengagement means of the adjacent panel so as to lock the panels together. Each castellated member projects from the edge of the panel outwardly to a position where it sits over the flange 110, 113. In this way the panel 117 sits on the flange 110 by virtue of its castellated projections 120 and the panel 122 sits over the flange 110 by virtue of its castellated projections 121. Each castellated projection member has therefore on its underside a slot into which the flange 110 projects.

Normally a flooring is formed by a whole series of these panels interconnected together by the intermeshing interengagement means at the ends to form a complete flooring structure which is in effect continuous across the floor.

In this arrangement, however, it is intended that the flooring provided by the panels 117 terminate at the rail 113 and the space between the rail 113 and the rail 114 be covered by the slats 10 as previously described.

This arrangement is obtained by mounting the slats 10 on top of a plurality of support elements 124, 125 which engage the end of each panel 117 and engage the flange 113 to provide a support for the end of the slat 10.

Thus each support element 124, 125 includes a flat plate portion 126 which extends the full length of the support element and forms an elongate strip having a flat face 127 on one side and a plurality of the castellated members 120 on the opposite side.

In effect, therefore the support element 124 comprises an edge portion of one of the panels so that the body of the panel is removed leaving only the edge plate 126 and the castellated projections 120. The castellated projections are of course of the same shape as the castellated projections 120 of the panel 117 and are shaped to cooperate with the castellated projections 121 of the panel 117. As previously described therefore, each projection 120 includes a slot 128 on its underside defined by a finger 129 on the side away from the plate 126 and an abutment 130 opposite to the finger 129 thus receiving the flange 113 therebetween as a friction fit.

On top of the portion defined by the plate 126 and the inter engagement castellated members 120 is provided an upstanding support flange 131 which extends along the full length of the support element. The flange thus defines a support flange for the slat in a similar manner to the support flanges previously described and indicated at 18 and 19 in FIG. 7.

The support elements 124 and 125 are separated into two elements divided at a centre of the panel 117. In such an arrangement therefore where the panel has a width between its sides of 24 inches, each of the support elements has a length of twelve inches. In a practical arrangement the support elements are injection molded as integral members formed from plastics material in a similar manner to the panels themselves and it is simpler and less expensive to manufacture the support elements in small pieces to reduce the size and complexity of the mold.

The support elements thus are additional simple molded plastics members which are manufactured as an accessory to the conventional flooring defined by the panels 117 and thus allow the slats to be supported on the conventional flooring at a height above the conventional flooring without the necessity for a separate framework to be provided for the slats. The existing framework defined by the rails 113 and 114 thus provides support both for the edges of the flooring panels 117 and, through the support elements 124, 125, to the slats 10.

As shown in FIG. 10, the right hand surface 151 of the flange 131 is offset toward the left relative to the surface 127 to form a shoulder 150. This shoulder can be used in some arrangements to support the slat so that the end of the slat butts against the right hand surface 151 amd is prevented thereby from transverse movement. The height of the flange can be greater than the end face of the slat to provide a surface above the slat against which the animal's foot can engage to obtain purchase.

In another arrangement, the surfaces 151 and 127 can be contiguous.

Figure 12:
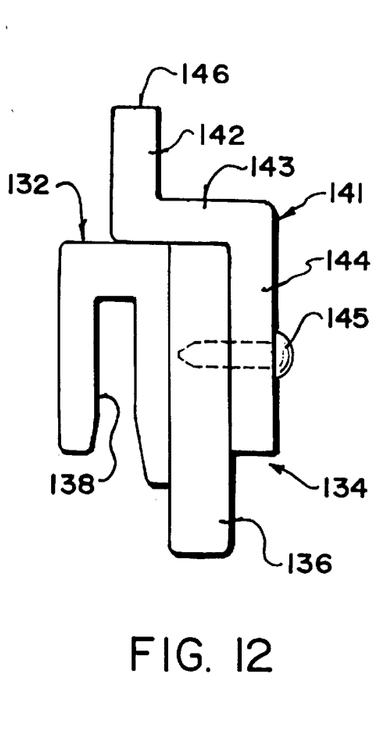
FIG. 12 is an end elevational view of a support element similar to but modified relative to the support element of FIGS. 10 and 11.

In FIG. 12 is shown a similar arrangement to that of FIGS. 10 and 11 which provides in effect the same structure for carrying out the same function as the support element 124. Thus the support element 134 shown in FIG. 12 comprises a plate 136 and a series of castellated projections 132. The castellated projections include slots 138. In this arrangement, however, the flange 141 is not formed integrally with the plate 136 but is instead formed from a metal angle including a flange 142, a horizontal section 143 and an attachment plate 144 which is bolted to the plate 136 by screws 145. This arrangement has the advantage that the position of the upper end 146 of the flange 141, both horizontally and vertically, can be selected by using different shapes and arrangements of the metal attachment. The molded element formed by the plate 136 and the projections 132 thus can be manufactured in large numbers for cooperation with the existing flooring and these members can be tailored to different size and arrangement of slats by selection of different ones of the metal mounts.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A floor structure for an animal containment pen comprising:

a plurality of generally rectangular slats;

each slat having an upper surface for receiving the animal thereon, two end edges spaced by a length of the slat and two side edges spaced by a width of the slat;

a support structure for supporting the slats in a row in side by side relationship so that the end edges of the slats at one end lie in a first common line along one side of the floor structure and the end edges at an opposed end lie in a second common line parallel to the first common line along an opposed side of the floor structure so that the floor structure has a first dimension equal to a length of the slats and a second dimension at right angles to the first dimension which is the sum of the widths of the plurality of the slats;

each slat having an array of elongate slotted perforations therethrough in rows and columns, the perforations having their length parallel to the end edges;

each slat having at a first side edge a first plurality of tabs and at a second side edge a second plurality of tabs with the tabs projecting outwardly from the respective side edge generally parallel to the plane of the upper surface, at least one of the tabs on the first side edge being at a top of the first side edge and at least one of the tabs on the first side edge being at a bottom of the first side edge, at least one of the tabs on the second side edge being at a top of the second side edge and at least one of the tabs on the second side edge being at a bottom of the second side edge and the tabs being arranged at positions longitudinally of the side edge such that at least one of the tabs on the first side edge of a first slat overlies at least one of the tabs on the second side edge of a next adjacent slat and at least one of the tabs on the second side edge of the next adjacent slat overlies at least one of the tabs of the first side edge of said first slat to prevent lifting of each of the slats relative its next adjacent slat;

the tabs having outer edges parallel to the respective side edge of the respective slat for abutting the side edge of the next adjacent slat;

and the tabs having ends which are spaced longitudinally of the side edge from the end of the next adjacent tab so as to define an elongate space between the tabs;

such that the elongate spaces define openings through the floor structure between the slats which lie at right angles to the slotted perforations in the slats;

each of the elongate spaces having a length which is greater than the length of each of the tabs so as to allow the feet of the animal to engage into the elongate spaces to gain purchase when the animal attempts to stand from a lying position.

2. The floor structure according to claim 1 wherein the first and second side edges each have two end tabs at ends thereof which are arranged at the top of the first side edge and at the bottom of the second side edge and at least one intermediate tab spaced longitudinally from the end tabs which is arranged at the bottom of the first side edge and at the top of the second side edge.

3. The floor structure according to claim 2 wherein there is only a single intermediate tab between the end tabs and wherein the elongate spaces are defined between the end tabs and the intermediate tab.

4. The floor structure according to claim 2 wherein the upper surface of the slat adjacent the elongate spaces is smooth so that the purchase is obtained by the engagement with side edges of the elongate space only.

5. A floor structure for an animal containment pen comprising:

a first flooring sheet having an upper surface for receiving the animal thereon with a first horizontal end edge of the sheet lying in a first common line;

a support framework supporting the sheet including a framework member at the common line for supporting the end edge of the sheet;

at least one rectangular slat, the slat having an upper surface for receiving the animal thereon, first and second end edges spaced by a length of the slat and two side edges spaced by a width of the slat;

and at least one support element supporting one end edge of the slat at said first end edge of the flooring sheet;

said support element comprising an edge strip member including engagement means thereon engaging the flooring sheet at the end edge thereof and engaging the framework member such that the support element is held in position by the engagement means and extends along the common line;

the edge strip member having a width of the edge strip member in a direction transverse to the common line which is less than a length of the edge strip member;

the edge strip member and the slat having cooperating abutment members thereon by which the slat is located on the edge strip member and prevented from movement thereon in a direction transverse to the common line.

6. The floor structure according to claim 5 wherein the abutment member on the strip member comprises a rib extending upwardly therefrom and the abutment member on the slat comprises a recess for receiving the rib therein.

7. The floor structure according to claim 6 wherein the rib extends substantially along the full length of the strip member.

8. The floor structure according to claim 5 wherein the edge strip member defines a substantially straight edge a face thereof opposite the inter-engaging means of the strip member.

9. The floor structure according to claim 5 wherein the edge strip member comprises an integral body molded from a plastics material.

10. The floor structure according to claim 5 wherein the flooring sheet comprises a plurality of floor panels, each panel having an upper surface for receiving the animal thereon, first and second end edges spaced by a length of the panel and two side edges spaced by a width of the panel, the panels being arranged in a row with the first end edges lying on the common line.

11. The floor structure according to claim 10 including a plurality of the slats arranged in side by side relationship to define a rectangular floor area and a plurality of edge strip members arranged end to end along the first end edges of the panels at the common line for supporting the end edges of the slats.

12. The floor structure according to claim 5 including a second sheet of flooring material wherein each of the sheets has an end edge with the end edges spaced to defining an opening therebetween, the slat being arranged such that the length thereof bridges the opening between the end edges of the sheets, the end edge of the second sheet also including an edge strip member thereon.

13. A floor structure for an animal containment pen comprising:

a flooring sheet having an upper surface for receiving the animal thereon with a first horizontal end edge of the sheet lying in a common line;

the flooring sheet comprising a plurality of floor panels, each panel having an upper surface for receiving the animal thereon, first and second end edges spaced by a length of the panel and two side edges spaced by a width of the panel, the panels being arranged in a row with the first end edges lying on the common line;

each of the first and second end edges of the panels including inter-engaging means thereon for interconnecting with similar inter-engaging means on an end edge of a similar one of the panels;

a support framework supporting the sheet including a framework member at the common line for supporting the end edge of the sheet;

at least one rectangular slat, the slat having an upper surface for receiving the animal thereon, first and second end edges spaced by a length of the slat and two side edges spaced by a width of the slat;

and at least one support element supporting one end edge of the slat at said first end edge of the flooring sheet;

said support element comprising an edge strip member including engagement means thereon engaging the flooring sheet at the end edge thereof and engaging the framework member such that the support element is held in position by the engagement means and extends along the common line;

the edge strip member having a width of the edge strip member in a direction transverse to the common line which is less than a length of the edge strip member;

the edge strip member and the slat having cooperating abutment members thereon by which the slat is located on the edge strip member and prevented from movement thereon in a direction transverse to the common line;

the edge strip member including inter-engaging means thereon interconnected with said inter-engaging means at said end edges of at least one the panels.

14. The floor structure according to claim 13 wherein the inter-engaging means of the panels and of the edge strip member each includes a plurality of castillated members projecting horizontally such that the castillated members of the edge strip member intermesh with the castellated members of at least one of the panels.

15. The floor structure according to claim 14 wherein the framework member comprises a vertical flange and wherein the castellated members of the edge strip member and the castellated members of the panel when intermeshed define a slot along an underside of the castellated members receiving an upper edge of the vertical flange.

16. The floor structure according to claim 13 wherein the abutment member on the strip member comprises a rib extending upwardly therefrom and the abutment member on the slat comprises a recess for receiving the rib therein and wherein the rib is located on the castellated members of the edge strip member and wherein the end edge of the slat overlaps onto the castellated members of the panels at the end edge of the panels at the common line.

17. The floor structure according to claim 13 wherein the edge strip ember defines a substantially straight edge on a face thereof opposite the inter-engaging means of the strip member.

18. The floor structure according to claim 13 wherein the edge strip member comprises an integral body molded from a plastics material.

19. The floor structure according to claim 13 including a plurality of the slats arranged in side by side relationship to define a rectangular floor area and a plurality of edge strip members arranged end to end along the first end edges of the panels at the common line for supporting the end edges of the slats.

20. The floor structure according to claim 13 including a second sheet of flooring material wherein each of the sheets has an end edge with the end edges spaced to defining an opening therebetween, the slat being arranged such that the length thereof bridges the opening between the end edges of the sheets, the end edge of the second sheet also including an edge strip member thereon.

* * * * *